(12) United States Patent
Jaroszczyk et al.

(10) Patent No.: US 6,387,144 B1
(45) Date of Patent: May 14, 2002

(54) ENHANCED PERFORMANCE FIBROUS FILTER MEDIA AND EXTENDED LIFE FLUID FILTER ASSEMBLY

(75) Inventors: Tadeusz Jaroszczyk; Jeffrey S. Morgan, both of Stoughton; Kent J. Kallsen, Oregon; Stephen L. Fallon; Daniel R. Cady, both of Madison; Jon S. Wake, Verona, all of WI (US)

(73) Assignee: Nelson Industries, Inc., Stoughton, WI (US)

(*) Notice: Subject to any disclaimer, the term of this patent is extended or adjusted under 35 U.S.C. 154(b) by 0 days.

(21) Appl. No.: 09/526,356

(22) Filed: Mar. 16, 2000

(51) Int. Cl.$^7$ ................................................ B01D 39/16
(52) U.S. Cl. .......................... 55/524; 55/487; 55/527; 55/528; 55/DIG. 39; 55/DIG. 43; 55/DIG. 45
(58) Field of Search .................... 55/487, 527, 528, 55/DIG. 5, 521, 524, DIG. 39, DIG. 43, DIG. 45, DIG. 44; 210/490, 491, 499, 500.1; 28/107, 111; 604/384; 96/59, 66

(56) References Cited

U.S. PATENT DOCUMENTS

| | | | |
|---|---|---|---|
| 2,688,380 A | | 9/1954 | MacHenry |
| 3,192,598 A | * | 7/1965 | Stevenson et al. ............ 28/107 |
| 3,258,900 A | | 7/1966 | Harms |
| 3,877,909 A | | 4/1975 | Hansen |
| 3,920,428 A | | 11/1975 | Kinsley, Jr. |
| 4,154,688 A | | 5/1979 | Pall |
| 4,181,513 A | | 1/1980 | Fukuda et al. |
| 4,353,723 A | | 10/1982 | Schulz et al. |
| 4,360,433 A | * | 11/1982 | Walker et al. ................. 55/524 |
| 4,369,117 A | | 1/1983 | White |
| 4,390,031 A | | 6/1983 | Berger |
| 4,593,706 A | | 6/1986 | Preston et al. |
| 4,678,578 A | | 7/1987 | Nodes et al. |
| 4,765,812 A | | 8/1988 | Homonoff et al. |
| 4,840,838 A | * | 6/1989 | Wyss ........................... 28/107 |
| 4,915,835 A | * | 4/1990 | Barzura et al. .......... 210/500.1 |
| 5,283,113 A | * | 2/1994 | Nishiwara et al. ............. 28/107 |
| 5,429,864 A | * | 7/1995 | Samuels ...................... 28/107 |
| 5,470,470 A | | 11/1995 | Leyat |
| 5,605,748 A | | 2/1997 | Kennedy et al. |
| 5,657,750 A | | 8/1997 | Colman et al. |

(List continued on next page.)

FOREIGN PATENT DOCUMENTS

| | | |
|---|---|---|
| DE | 3414578 A | 10/1985 |
| DE | 89 01 213 | 5/1989 |
| DE | 43 36 595 | 5/1995 |
| DE | 195 41 252 | 12/1996 |
| DE | 19821869 A1 | 11/1999 |
| FR | 2742069 A | 6/1997 |
| GB | 2 195 917 | 4/1988 |

*Primary Examiner*—David A. Simmons
*Assistant Examiner*—Minh-Chau T. Pham
(74) *Attorney, Agent, or Firm*—Andrus, Sceales, Starke & Sawall, LLP

(57) ABSTRACT

Enhanced performance fibrous media (60) is provided by orienting filter media fibers (62) dominantly parallel to the fluid flow direction (46). Filter media construction is provided by a sheet (80) having an internal pleated subsheet (88) with pleats (92, 94) engaging and packed against each other sufficiently tightly and bonded (104) such that fluid flows along the flow direction through the pleats in parallel therewith, rather than between the pleats and then transversely therethrough. An extended life two-stage fluid filter assembly includes first and second filter elements (80 and 112), wherein the pleats (114, 116) of a main downstream filter element (112) are spaced from each other along a spacing direction (122) transverse to the flow direction (46) and defining a transverse gap (124) therebetween through which fluid flows, and wherein the pleats (92, 94) of an upstream prefilter element (80) are packed against each other without such transverse gap and blocking fluid flow therebetween.

25 Claims, 4 Drawing Sheets

U.S. PATENT DOCUMENTS

| | | |
|---|---|---|
| 5,667,544 A | 9/1997 | Haas et al. |
| 5,690,823 A | 11/1997 | Reipur et al. |
| 5,695,487 A * | 12/1997 | Cohen et al. ............... 604/384 |
| 5,702,603 A | 12/1997 | Johnson et al. |
| 5,726,107 A | 3/1998 | Dahringer et al. |
| 5,785,725 A | 7/1998 | Cusick et al. |
| 5,898,981 A * | 5/1999 | Legare ....................... 28/107 |
| 5,928,414 A * | 7/1999 | Whenchak et al. ........... 55/521 |
| 5,979,030 A * | 11/1999 | Legare .................. 55/DIG. 5 |
| 6,056,809 A * | 5/2000 | Chapman .................... 55/521 |
| 6,165,244 A * | 12/2000 | Choi .......................... 55/527 |

\* cited by examiner

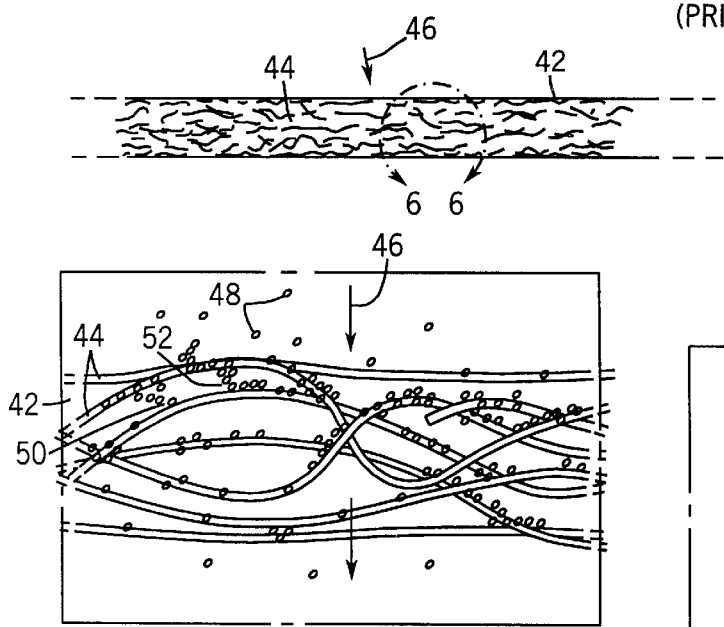
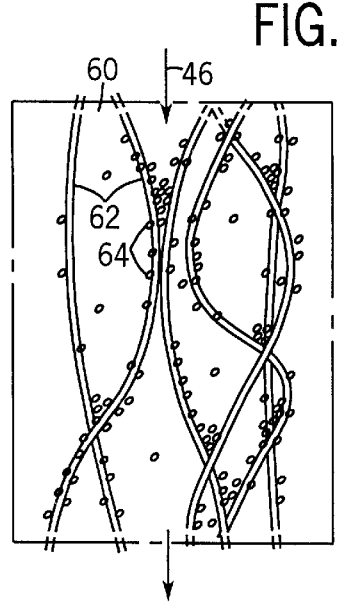
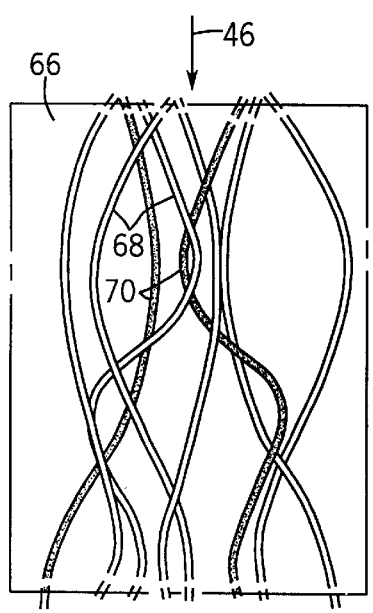
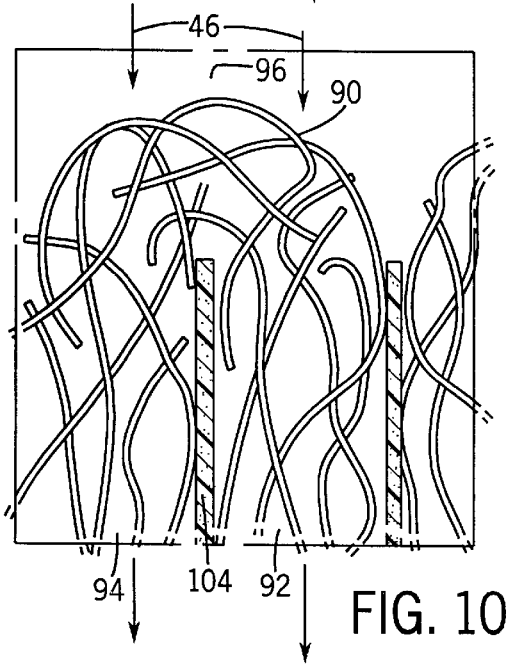
FIG. 5 (PRIOR ART)
FIG. 6 (PRIOR ART)
FIG. 7
FIG. 8
FIG. 10

ENHANCED PERFORMANCE FIBROUS FILTER MEDIA AND EXTENDED LIFE FLUID FILTER ASSEMBLY

BACKGROUND

The invention relates to filter media and filter assemblies for filtering fluid including air.

The invention arose during development efforts directed toward increasing filter life in filters exposed to high dust concentrations of dry and/or sooty and/or oily particles. Prior non-woven fibrous filter media use needling techniques to achieve required media thickness and solidity. During the process of needling, small holes are formed through the media. Such needle holes, formed in felted and other synthetic filter materials, promote the penetration of incoming and detached particles. These needle holes cause discontinuities in the filter media structure because they are relatively large pores compared to those in the bulk fiber matrix. The large pores offer a path of low resistance to the fluid flow. Because smaller pores are clogged faster by deposited particles, the velocity through the larger needle holes increases correspondingly. The holes caused by needle punching and the increased velocity therethrough thus create conditions for particle penetration and reentrainment. Consequently, both uncaptured and detached dust particles can penetrate the filter through such needle holes, leading to lower filter efficiency.

Further in the noted prior fibrous filter media, the fibers extend dominantly perpendicular to the flow direction of fluid through the filter media. In this type of orientation, the surface area of particle contact and adhesion with the fibers is small while the face surface area of particle clusters is large as captured dust particles build on each other. Sometimes dust particle aggregates form bridges between fibers. Such particle aggregates and bridges can be easily blown off, particularly if exposed to high fluid flow rates or pulsation. The particles form aggregates which can form particle bridges between fibers that block flow through the media and shorten filter life due to premature clogging. Furthermore, such particle aggregates and bridges are subject to instability and the noted break-off, particularly in areas adjacent the noted needle holes through which the air velocity increases. Such needle holes may be penetrated by an increased number of particles, which is undesirable because of such release and reentrainment of contaminant particles.

Contaminant cake stability is another problem in prior fibrous non-woven filter media. Because such media has very little rigidity and compression resistance, the contaminant cake which builds on the filter media can be easily dislodged in localized areas. The noted prior needling of such media improves rigidity and compression resistance when compared to air-laid nonwovens, however there is a need for additional stability of the contaminant dust cake to improve filtration performance. Furthermore, the noted needle holes cause the noted large pores which cause a nonuniform distribution of the dust cake, i.e. large craters at the pores, and dust cake particle agglomeration and bridging between fibers at areas between such needle hole pores.

SUMMARY

The present invention provides a simple and effective solution to the above noted and other filter problems. In one desirable aspect, the invention eliminates needling and the needle holes caused thereby in fibrous filter media, including non-woven media. This eliminates the noted large pores in the bulk fiber matrix at needle holes, which in turn eliminates the noted path of low restriction to the fluid flow and increased velocity therethrough, thus eliminating the noted penetration of uncaptured and detached reentrained dust particles through such needle holes, otherwise causing lower filter efficiency.

In another aspect, the surface area of particle adhesion and contact to fibers is increased and the face area of dust particle aggregates and bridging between fibers is reduced, preventing blockage to flow otherwise caused thereby, and reducing risk of reentrainment, and providing a more stable filtration process.

In another aspect, rigidity and compression resistance of the filter media is enhanced, increasing contaminant cake stability. In addition, the invention enables a more uniform distribution of a stable dust cake, including elimination of the noted craters otherwise formed at needle holes, and contaminant particle aggregates and bridging between fibers at areas between such craters, which in combination with the noted increased rigidity and compression resistance of the filter media, enhancing contaminant cake stability.

The present invention provides an improved method of filtering particles in fluid flowing along a given flow direction through filter media having a plurality of fibers, including an improved method for increasing capture of and retention of contaminant particles by the fibers of the filter media. In one aspect, the method includes, in combination: increasing residence dwell time of particles moving along the fibers to increase the chance of, and extend the time of, fiber-particle contact; increasing Brownian diffusion probability of particles diffusing to the fibers; increasing the spread of, and even loading of, particles along the fibers; reducing particle agglomeration and particle bridging between fibers which would otherwise block flow and be subject to instability and reentrainment if exposed to high flow rates or pulsation. The increased residence dwell time, increased Brownian diffusion, increased spread and evenness of particle loading, and reduction of particle agglomeration and bridging, is accomplished by orienting the fibers parallel to the fluid flow direction in combination with providing fibers of sufficient length along the flow direction such that residence dwell time is increased, Brownian diffusion is increased, spread and evenness of particle loading is increased, and particle agglomeration and bridging is reduced, all as compared to, and relative to, filter media fibers extending perpendicular to the fluid flow direction.

The contact surface area between the contaminant particles and their aggregates remains large, and the face area of the contaminant aggregates stays small during contaminant loading. This is a favorable condition for a stable filtration process.

A significant advantage of the invention is higher contaminant capacity due to favorable contaminant loading. In the noted prior art, contaminant accumulates on the fibers and aggregates on itself and also forms long and fragile bridges between fibers blocking fluid flow. In the present invention, contaminant particles forming the contaminant cake are distributed more evenly and uniformly along the entire fiber length. Contaminant loading is thus more evenly and uniformly distributed not only along a surface area along a plane perpendicular to the flow direction but also along a fiber length extending along a plane parallel to the flow direction. This uniformity of contaminant distribution along both planes provides decreased filter pressure drop and increased contaminant loading capability.

In a further desirable aspect, the invention increases rigidity and compression resistance of the fibrous filter media, including at low solidity, and enhances stability of the uniformly distributed contaminant cake, including resistance to reentrainment even if exposed to high flow rates or pulsation.

In preferred form, filter media construction is provided including a sheet of filter material having a thickness dimension between oppositely facing first and second sides for filtering particles in fluid flow therethrough along a flow direction perpendicular to the sheet and the first and second sides and parallel to the thickness dimension. The sheet is formed by an internal pleated subsheet of a plurality of fibers and having a plurality of pleats extending between first and second sets of pleat tips, the pleats extending parallel to the flow direction, the first set of pleat tips providing the first side of the sheet, and the second set of pleat tips providing the second side of the sheet. The pleats engage each other and are packed sufficiently tightly such that fluid flows along the flow direction through the pleats in parallel therewith, rather than between the pleats and then transversely therethrough. The subsheet has a pre-pleated planar condition with the fibers extending dominantly parallel thereto and dominantly unidirectionally parallel to each other. The subsheet has a pleated condition forming the sheet, wherein the fibers extend along the pleats substantially parallel to the flow direction, and the fibers extend around the pleat tips substantially parallel to each respective side of the sheet and substantially perpendicular to the flow direction. The pleats are preferably bonded to each other to prevent flow of fluid therebetween along the flow direction parallel to the sheets. The bonding of the pleats and fibers to each other also enhances rigidity and compression resistance of the sheet along the thickness dimension. This eliminates the above noted needle holes associated with needling. The enhanced rigidity and compression resistance of the sheet along the thickness dimension also increases contaminant cake stability. The sheet may be used as a high capacity filter or as a prefilter, to increase total filter efficiently and capacity.

In a further aspect of the invention, the noted filter media construction enables the noted subsheet to be non-needled and non-woven and to have sets of different fibers therein, including different diameter fibers and fibers with various surface charges including opposite polarity fibers. The latter are desirable to enable use of the known triboelectric effect. Such triboelectric effect is particularly desirable in the presently enabled construction because the oppositely charged or differentially charged fibers define a plurality of electric field flux lines therebetween, which flux lines extend dominantly perpendicular to the flow direction and are stacked along the flow direction in a plane parallel thereto, such that fluid flows along such plane and perpendicular to the flux lines and cuts serially sequentially across plural flux lines, increasing the chances of triboelectric capture due to the increased number of flux lines crossed. The triboelectric effect is particularly useful for capturing small particles which can clog a downstream main or primary filter. In a further aspect, the present filter media construction enables the use of differing diameter fibers to enhance efficiency.

In another aspect of the invention, an extended life fluid filter assembly is provided, including first and second filter elements. Each filter element has pleated filter media with a plurality of pleats extending between first and second sets of pleat tips. The pleats of each filter element are substantially parallel to the fluid flow direction and extend along such flow direction between respective pleat tips. The pleats of one of the filter elements are spaced from each other along a spacing direction transverse to the flow direction and define a transverse gap therebetween through which fluid flows along the noted flow direction. Such fluid then turns and flows transversely through the pleats of such filter element. The pleats of the other filter element are packed against each other and bonded together without a transverse gap and block fluid flow therebetween. The fluid flows along the flow direction through such pleats of such other filter element in parallel therewith, rather than transversely therethrough.

In a preferred embodiment, the extended life fluid filter assembly includes a main filter element and a prefilter element. The main filter element is provided by pleated filter media having a plurality of pleats extending between first and second sets of pleat tips. The pleats extend generally parallel to the fluid flow direction and are spaced from each other along a spacing direction transverse to such flow direction and defining a transverse gap therebetween through which fluid flows, such that fluid flows along the flow direction between the pleat tips of the first set and then transversely through the pleats and then along the flow direction between the pleat tips of the second set. The prefilter element is adjacent and upstream of the main filter element, may or may not be bonded to it and is provided by a sheet of filter material having a thickness dimension between oppositely facing first and second sides for filtering particles in fluid flow therethrough along the flow direction perpendicular to the sheet and the first and second sides and parallel to the thickness dimension. The second side is adjacent the main filter element. The sheet is formed by an internal pleated subsheet composed of a plurality of fibers and having a plurality of pleats extending between first and second sets of pleat tips. The pleats of the subsheet extend parallel to the fluid flow direction. The first set of pleat tips of the subsheet provide the first side of the sheet. The second set of pleat tips of the subsheet provide the second side of the sheet. The pleats of the subsheet engage each other and are packed sufficiently tightly against each other such that fluid flows along the flow direction through the pleats of the subsheet in parallel with such pleats, rather than between such pleats and then transversely therethrough. The subsheet has a pre-pleated planar condition with the fibers extending dominantly parallel thereto and dominantly unidirectionally parallel to each other. The subsheet has a pleated condition forming the sheet, wherein the fibers extend along the pleats of the subsheet substantially parallel to the flow direction, and the fibers extend around the pleat tips of the subsheet substantially parallel to each respective side of the sheet and substantially perpendicular to the flow direction.

In a further aspect in combination with the noted two stage fluid filter assembly, the invention provides a desirable filtering method increasing uniformity of the contaminant cake on the prefilter by reducing particle agglomeration and particle bridging between prefilter media fibers which would otherwise block flow and reduce uniformity and be subject to instability and reentrainment. This is provided by orienting the fibers dominantly parallel to the flow direction to more evenly load contaminant particles along the entire length of the fibers as compared to, and relative to, filter media fibers extending perpendicular to the flow direction. This provides uniformity of the contaminant cake on said prefilter along a plane parallel to the flow direction. Uniformity of the contaminant cake is also provided along a plane perpendicular to the flow direction by eliminating the above noted craters at needle holes.

BRIEF DESCRIPTION OF THE DRAWINGS

FIG. 5 is a sectional view of fibrous non-woven filter media.

FIG. 6 is an enlarged view of section 6—6 of FIG. 5.

FIG. 7 is an enlarged schematic sectional view of fibrous non-woven filter media with flow direction orientation in accordance with the invention.

FIG. 8 is an illustration like FIG. 7 and shows an alternate embodiment.

FIG. 10 is an enlarged view of section 10—10 of FIG. 9.

DETAILED DESCRIPTION OF THE INVENTION

Prior Art

Figure 1:
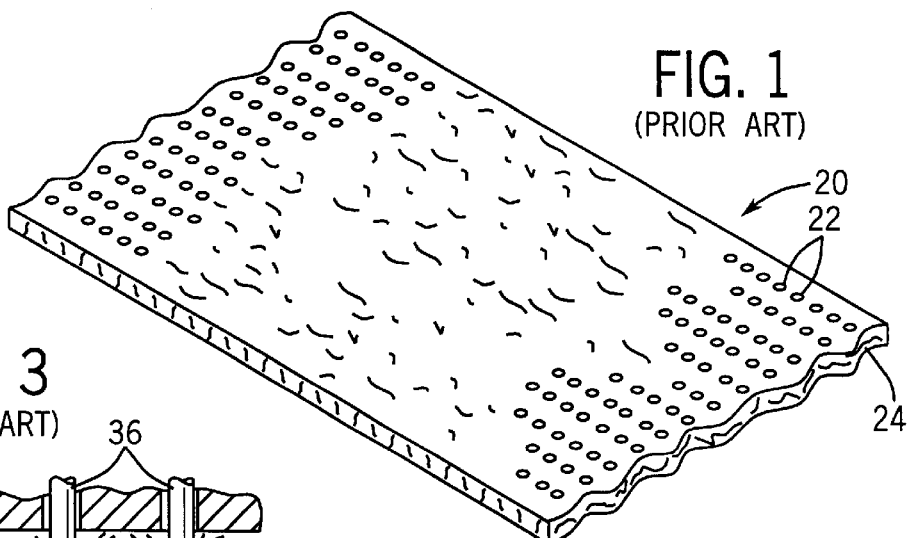
FIG. 1 is a schematic perspective view of fibrous nonwoven filter media known in the prior art.
Figure 3:
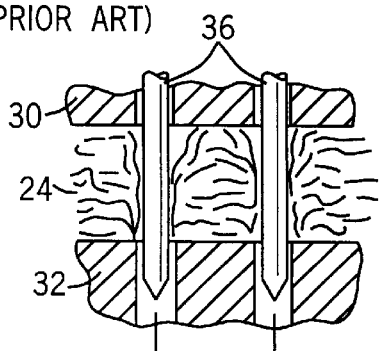
FIG. 3 is an enlarged view of section 3—3 of FIG. 2.
Figure 2:
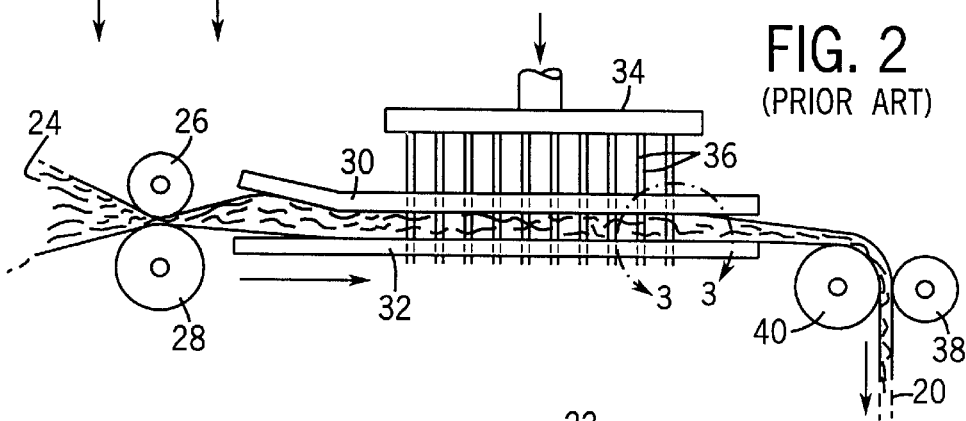
FIG. 2 is a schematic illustration of the forming process for the media of FIG. 1.
Figure 4:
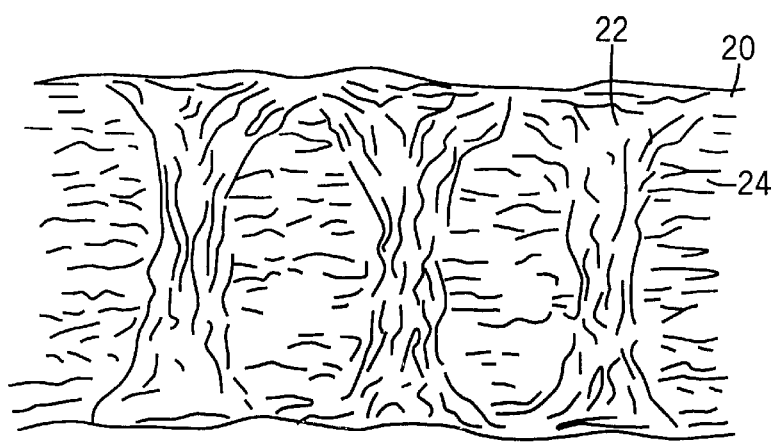
FIG. 4 is an enlarged sectional view of a portion of the media of FIG. 1, after needling.

FIG. 1 shows a sheet of non-woven fibrous filter material 20 known in the prior art. Non-woven materials typically use needling techniques to achieve desired media thickness and solidity. During the process of needling, small holes 22 are formed thorough the media. As shown in FIG. 2, synthetic or felted fiber media 24 is fed between rollers 26 and 28 and then between platens 30 and 32 which hold the material in place during downward movement of mandrel 34 having a plurality of lower downwardly extending needles 36 which punch through material 24, FIG. 3, to form the noted needle holes 22, FIG. 4, whereafter the needled sheet is fed through exit rollers 38 and 40. While needling is desirable to hold the non-woven fibrous media together and achieve desired media thickness and solidity, a disadvantage is that the needle holes present discontinuities in the filtering media because they are relatively large pores as compared to the bulk fiber matrix. The large pores offer a path of low resistance to fluid flow, such as air. Because smaller pores of the remaining bulk fiber matrix are clogged faster by contaminant particles such as dust, the velocity through the larger needle holes 22 increases correspondingly, as in a venturi. Consequently, both uncaptured and detached reentrained contaminant particles can penetrate the filter through such needle holes 22, causing lower filter efficiency.

FIG. 5 shows filter material 42 of non-woven fibrous filter media as known in the prior art, which may or may not be needled. The fibers 44 in the sheet run predominantly along or parallel to the sheet, i.e. horizontally left-right in the orientation of FIG. 5, and perpendicular to the direction of fluid flow as shown at arrow 46, FIGS. 5 and 6. The surface area of the fibers available for adhesion and capture of contaminant particles 48 is perpendicular to fluid flow direction 46. Contaminant particles will aggregate on each other for example as shown at aggregate 50, and will also form particle bridges between fibers for example as shown at 52. Contaminant particle aggregates and bridges block flow and shorten filter life by leading to premature restriction and pressure drop. Furthermore, if filter media sheet 42 is needled, the larger pores provided by needle holes 22 offer the noted path of lower restriction and higher velocity, particularly due to faster clogging of smaller pores at adjacent areas between the needle holes, particularly at aggregates 50 and bridges 52. Consequently, as above noted, both uncaptured and detached reentrained contaminant particles can penetrate the filter through the needle holes. The contaminant particle aggregates and bridges in areas between needle holes are further subject to instability and reentrainment if exposed to high flow rates or pulsation, for example at the beginning of filter operation, such as at start-up of an internal combustion engine and the initial high air flow rate through the air filter therefor, and also due to the high velocity venturi effect of flow through needle holes 22 if the media is needled.

PRESENT INVENTION

In the present invention, a simple and effective solution is provided for the above-noted and other problems. The invention provides a method of filtering particles in a fluid flowing along flow direction 46, FIG. 7, through filter media 60 having a plurality of fibers 62. The improved method increases capture of and retention of contaminant particles 64 by fibers 62 by increasing residence dwell time of particles moving along the fibers to increase the chance of, and extend the time of, fiber-particle contact, increasing Brownian diffusion probability of particles diffusing to the fibers, increasing the spread of, and even loading of, particles along the fibers, and reducing particle agglomeration and particle bridging between fibers which would otherwise block flow and be subject to instability and reentrainment if exposed to high flow rates or pulsation. The increased residence dwell time, increased Brownian diffusion, increased spread and evenness of particle loading, and reduced particle agglomeration and bridging, are all accomplished simply by orienting fibers 62 dominantly parallel to flow direction 46 in combination with providing fibers 62 of sufficient length along flow direction 46 such that residence dwell time is increased, Brownian diffusion is increased, spread and evenness of particle loading is increased, and particle agglomeration and bridging is reduced, all as compared to, and relative to, filter media fibers 44, FIG. 6, extending perpendicular to flow direction 46. In comparing the perpendicular fiber orientation of FIG. 6 against the parallel fiber orientation of FIG. 7, it is seen that the perpendicular fiber orientation provides shorter particle-fiber contact time, less chance of diffusion, greater particle bridging, and uneven loading along the fiber length, whereas the parallel fiber orientation of FIG. 7 provides a greater chance of longer particle-fiber contact time, a greater chance of diffusion of a particle to a fiber, less particle bridging between fibers, and more even loading along the fiber length.

The parallel orientation of FIG. 7 enables the use of non-woven, non-needled media, which is desirable. In one embodiment, fibers 62 are the same, for example synthetic material such as polyester, and have the same diameter. In another embodiment, at least first and second sets of different fibers are used. The latter alternative may include differing fiber diameters to enhance efficiency. In a further embodiment, a triboelectric fiber combination is used to provide a triboelectric effect. Triboelectric fibers are or may become (with usage) differentially charged, as is known. FIG. 8 shows filter media 66 having positively charged fibers 68, such as nylon, silk, cotton, cellulose, acrylic, polyethylene, polypropylene, modacrylic, and negatively charged fibers 70 such as chlorofiber. The oppositely charged fibers define a plurality of electric field flux lines therebetween, and in the desirable orientation of FIG. 8 such flux lines extend dominantly perpendicular to flow direction 46 and are stacked along such flow direction in a plane parallel thereto such that fluid flows along such plane and perpendicular to the flux lines and cuts serially sequentially across plural flux lines, increasing the chances of triboelectric capture due to the increased number of flux lines crossed, relative to known triboelectric capture techniques.

Figure 9:
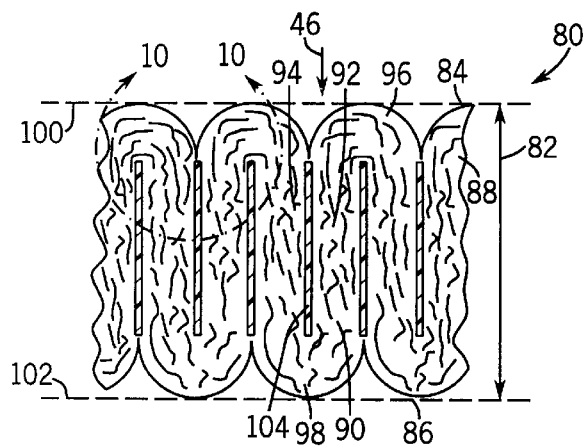
FIG. 9 illustrates filter media construction in accordance with the invention.

Filter media construction, FIGS. 9 and 10, is provided by a sheet 80 having a thickness dimension 82 between oppositely facing first and second sides 84 and 86 for filtering contaminant particles in fluid flow therethrough along flow direction 46 perpendicular to sheet 80 and first and second sides 84 and 86 and parallel to thickness dimension 82. Sheet 80 is formed by an internal pleated subsheet 88 comprising a plurality of fibers 90 and having a plurality of pleats 92, 94, etc. extending between first and second sets of pleat tips 96 and 98. Pleats 92, 94 extend parallel to flow direction 46. The first set of pleat tips 96 provides the first side 84 of sheet 80. The second set of pleat tips 98 provides the second side 86 of sheet 80. One or both sides 84 and 86 may additionally include a thin scrim layer or the like as shown at dashed lines 100 and 102.

Pleats 92, 94, etc., engage each other and are packed against each other sufficiently tightly such that fluid flows along flow direction 46 through the pleats in parallel therewith, rather than between the pleats and then transversely therethrough as in standard pleated filter media designs. Subsheet 88 has a pre-pleated planar condition with fibers 90 extending dominantly parallel thereto and dominantly unidirectionally parallel to each other. Subsheet 88 has a pleated condition as shown in FIGS. 9 and 10 forming macro sheet 80 wherein fibers 90 extend along pleats 92, 94, etc., substantially parallel to flow direction 46. Fibers 90 extend around pleat tips 96, 98 substantially parallel to each respective side 84, 86 of sheet 80 and substantially perpendicular to flow direction 46. In preferred form, pleats 92, 94, etc. are bonded to each other as shown at adhesive 104 to prevent flow of fluid therebetween along flow direction 46 parallel to pleats 92 and 94. The bonding of the pleats to each other enhances compression resistance of sheet 80 along thickness dimension 82 and eliminates the need for needle holes associated with needling.

Figure 11:
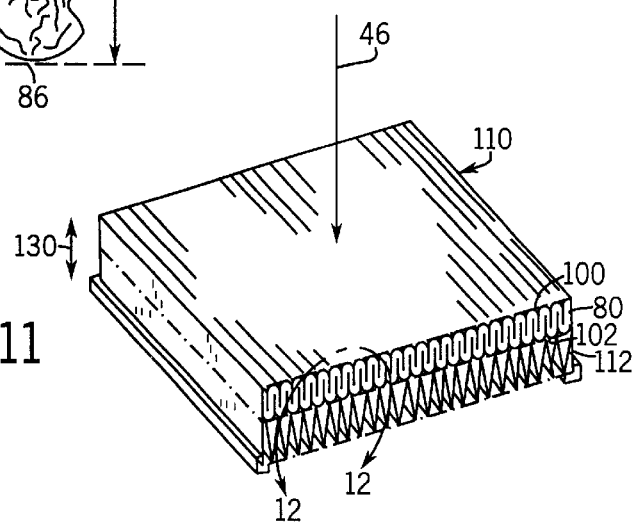
FIG. 11 shows an extended life two stage fluid filter assembly in accordance with the invention.
Figure 12:
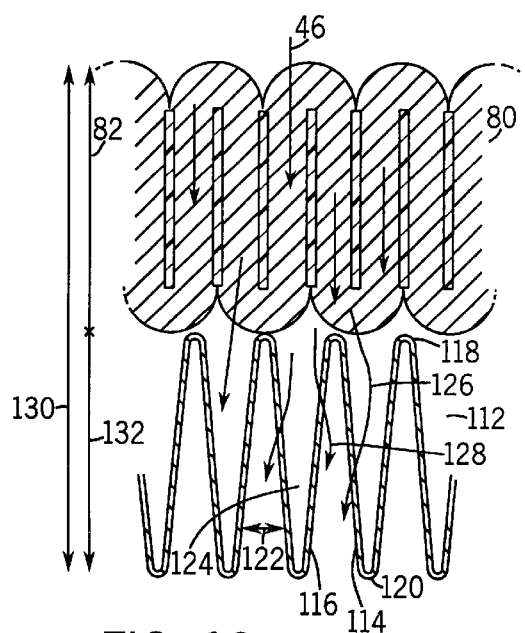
FIG. 12 is an enlarged view of section 12—12 of FIG. 11.

Sheet 80 may be used as a high capacity filter or as a prefilter to increase total filter efficiency and capacity. FIGS. 11 and 12 show an embodiment of the latter which is an extended life two-stage fluid filter assembly 110 for filtering particles in fluid flow therethrough along flow direction 46. The assembly includes a first upstream prefilter element provided by sheet 80, and a second downstream main filter element 112. Filter element 112 is a pleated media (e.g., paper) filter element having a plurality of pleats 114, 116, etc. extending between first and second sets of pleat tips 118 and 120. The pleats of each of filter elements 80 and 112 are substantially parallel to flow direction 46 and extend along flow direction 46 between respective pleat tips. The pleats of filter element 112 are spaced from each other along a spacing direction 122 transverse to flow direction 46 and defining a transverse gap 124 therebetween through which fluid flows. Fluid flows transversely through pleats 114, 116 of filter element 112, as shown at arrows 126, 128. The pleats of filter element 80 are packed against each other, as above described, without such transverse gap and block fluid flow therebetween. In upstream filter element 80, fluid flows along flow direction 46 through pleats 92, 94 in parallel therewith, rather than transversely therethrough. Fluid flow through pleats 114, 116 of downstream main filter element 112 is substantially transverse to flow direction 46. Fluid flow through pleats 92, 94 of upstream prefilter element 80 is substantially parallel to flow direction 46. In FIGS. 11 and 12, each of main filter element 112 and prefilter element 80 are flat planar panels.

Figure 13:
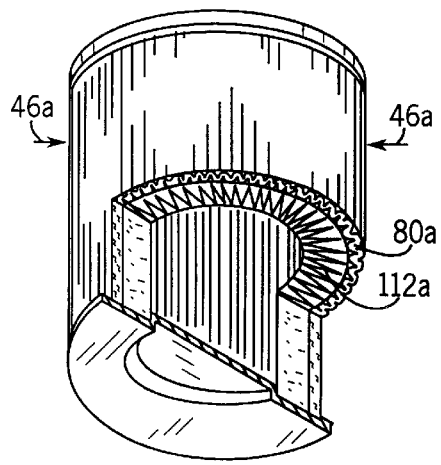
FIG. 13 shows another embodiment of an extended life two-stage fluid filter assembly in accordance with the invention.

In another embodiment, FIG. 13, each of main filter element 112a and prefilter element 80a are annular, and flow direction 46a is radial relative thereto. Prefilter element 80a is concentric to main filter element 112a. In further embodiments, filter elements 80 and 112 may be conical or frustoconical, or other desired shapes. In each case, filter media construction 80 may be used alone or in combination with another filter element such as 112.

When sheet 80 is used as a prefilter, it is preferred that the solidity of subsheet 88 be in the range of 1% to 10%, the fiber size of fibers 90 be in the range of 0.1 to 50 denier, the thickness dimension 82 of sheet 80 be in the range of 2 to 75 millimeters, and the ratio of velocity of fluid flow through prefilter element 80 to the velocity of fluid flow through main filter element 112 be in the range of 2 to 25.

The invention enables use of a non-woven non-needled fibrous macro filter media sheet formed by a convoluted or pleated internal structure subsheet for fluid filtration, including gaseous or air filtration. Such a sheet 80 may be used as a high capacity filter or as a prefilter to increase total filter efficiency and capacity. The thickness 82 of the filter media is equivalent to the internal convolution or pleat depth. The media preferably retains its form by bonding at 104 the fibers on adjacent faces of the pleats 94, 92. This enhances the media's compression resistance and increases its rigidity such that no additional backing is required for the media to retain its shape, though additional outer scrim layers such as 100 and 102 may optionally be added if desired. The tight packing of the pleats and bonding at 104 is further desired to eliminate the need for needle holes associated with prior needling techniques, thereby eliminating needle holes 22, and improving filtration efficiency. If desired, bonding 104 may be deleted if pleats 92, 94 are sufficiently tightly packed. The tightly packed convoluted internal subsheet structure 88 causes the majority of fibers 90 to be oriented in a direction parallel to fluid flow 46, affording advantages of longer residence time for particles passing through the media, reduced particle agglomeration and bridging, higher collapse strength, increased capacity and efficiency. The fiber orientation and filter media construction is further desirable because it is conducive to the use of mixed fibers, including different diameter fibers and/or different polarity fibers, the latter being further desirable because it provides an enhanced triboelectric effect due to flux lines stacked along the flow direction such that fluid flows perpendicular to the flux lines and cuts serially sequentially across plural flux lines, increasing the chances of triboelectric capture due to the increased number of flux lines crossed. This enhanced triboelectric effect, beyond traditional triboelectric mechanisms, is useful for capturing small particles which typically clog a downstream main or primary filter such as 112.

The invention is particularly useful for increasing filter life in filters exposed to high dust concentrations of dry and/or sooty and/or oily particles. Previous non-woven designs used needling techniques to achieve the required media thickness and solidity. During the process of needling, needle holes are formed through the media. Such needle holes, formed in felted and other synthetic filter materials, promote the penetration of detached and reentrained particles. The needle holes present discontinuities in the filter media structure because they are relatively large pores when compared to the bulk fiber matrix. The large pores offer a path of low resistance to the fluid flow. Because the smaller pores in areas laterally between needle holes are clogged faster by deposited particles, the velocity through the larger needle holes increases correspondingly. Consequently, both captured and detached reentrained dust particles can penetrate the filter through such needle holes, resulting in lower filter efficiency. Needle punching is thus undesirable because it creates favorable conditions for particle reentrainment. Furthermore, since the majority of fibers in prior designs are positioned perpendicularly to the flow direction, the surface area of particle adhesion is small while the face surface area of particle clusters is larger. Thus, particle aggregates and bridges can be easily blown off. In the present improvement orienting the fibers primarily parallel to the flow direction, the contact surface area between the dust particles and their aggregates remains large and the face area of the dust aggregates stays small during dust loading. This is a favorable condition for a stable filtration process.

The extended life two-stage filter assembly noted above may be provided in a variety of geometrical configurations, as noted, to achieve ultrahigh contaminant holding capacity and long life in high concentration areas, for instance in dusty construction areas and/or in oily and sooty environments. The main filter 112 is located downstream of the prefilter 80. The main filter is made of pleated filter media impregnated cellulose with a possible mixture of synthetic fibers such as polyester to secure shape stability when exposed to moisture, water and snow. The media of the pleated main filter element 112 can be treated with an oily substance to prevent clogging by sooty particles, as is known. The upstream prefilter 80 is made of non-woven non-needled filter media of synthetic fibers of preferably differently charged materials to fully utilize the triboelectric effect, and to provide an enhanced triboelectric effect as noted.

The reduction of blow-off detachment and reentrainment of contaminant particles is a significant advance. In the prior art, since the majority of the fibers are positioned perpendicular to the flow direction, the surface area of particle adhesion is small while the face surface area of particle clusters at agglomerates and particle bridges is large. Therefore, the particle aggregates can be more easily blown off since the force of detachment is proportional to fluid velocity and cluster surface area exposed to flow. By instead orienting the fibers parallel to the flow direction, the contact surface area between the dust particles and their aggregates remains large and the face area of the dust aggregates stays small during dust loading. This is a favorable condition for a stable filtration process providing a longer chance of fiber-particle contact time and a greater chance of diffusion to the fiber surface area, increased diffusion probability, improved contaminant loading along the fiber length and increased spread of and even loading of particles along the fibers, eliminating needle holes and the noted problems associated therewith, and providing an enhanced triboelectric effect when differentially charged fibers are used. In the present design, contaminant holding capacity is higher as compared to prior designs because of the favorable contaminant loading process. In prior designs, the contaminant can accumulate on the fibers such that particle bridges form, blocking fluid flow. In the present design, the contaminant particle cake is distributed more evenly on the entire fiber surface area. Because of the uniform contaminant distribution, filter pressure drop decreases and the amount of dust or other contaminant loaded within the filter increases before terminal pressure drop.

Another advantage of the disclosed filter media construction is that the contaminant cake remains stable due to the noted high rigidity and compression resistance. The compression resistance of the media at its low solidity enables formation of a uniformly distributed and stable contaminant cake which does not collapse when exposed to flow pulsation and vibration of the filtration system. Because of the uniformity of the internal contaminant cake in the prefilter, the contaminant particles penetrating the prefilter are evenly distributed over the entire area of the pleated main filter element 112 located downstream of prefilter 80. Since pressure drop reaches its lowest value for uniformly distributed particles on the media surface, i.e. a uniformly thin contaminant cake, the contaminant capacity reaches its maximum value.

The present invention provides a method of increasing contaminant cake stability on filter media fibers in filter media filtering contaminant particles by engaging and packing pleats 92 and 94 against each other, preferably by bonding at 104, to enhance rigidity and compression resistance of sheet 80 along thickness dimension 82. The invention further provides a method for evenly distributing fluid flow over the area of main filter element 112 after passage through prefilter element 80, by increasing uniformity of the contaminant cake on prefilter 80 by reducing particle agglomeration and particle bridging between prefilter media fibers which would otherwise block flow and reduce uniformity and be subject to instability and reentrainment, and instead orient prefilter filters 62, FIG. 7, 90, FIG. 9, dominantly parallel to flow direction 46 to more evenly load contaminant particles along the entire length of the fibers as compared to, and relative to, filter media fibers extending perpendicular to the flow direction.

Since the fibers in the new orientation are positioned parallel to the flow direction, the dwell or residence time for the contaminant particles moving the vicinity of the fiber surface is extended. This enhances small particle, e.g. diesel soot, captured by the fibers because of diffusion and by triboelectric effect if differentially charged fibers are used, which effect is enhanced as above noted. The parallel fibers form channel-like paths in which viscous flow predominates. In the viscous flow, the boundary layer is slower and relatively thick, and hence more particles will have a chance to settle on the fiber surface due to Brownian diffusion and due to electrostatic mechanisms. The present method and orientation makes conditions favorable for these mechanisms to occur.

The table below shows test results for filter assembly 110 of FIG. 11. The assembly had a length of 175 millimeters, a width of 175 millimeters, and a height or thickness 130 of 38 millimeters. The thickness 82 of prefilter 80 was 25 millimeters, and the thickness 132 of main filter 112 was 13 millimeters. The flow rate was 85 m$^3$/h (cubic meters per hour). Pa denotes pascals. kPa denotes kilopascals. g denotes grams. g/m$^2$ denotes grams per square meter. The first three rows in the table note performance results for a needled perpendicular fiber media known in the prior art, FIGS. 1–6, placed upstream of main filter element 112 in place of prefilter 80. The fourth row lists the performance of assembly 110 with prefilter 80 upstream of main filter element 112. Of note is the significantly increased dust holding capacity of 505.9 grams versus the dust holding capacity of the prior designs of which the highest dust holding capacity achieved was 378.3 grams.

Table Filtration Performance

| Design | Initial Pressure drop, Pa | Terminal Pressure drop, kPa | Efficiency, % | Dust Holding Capacity, g |
|---|---|---|---|---|
| Panel element with a classical prefilter with thickness of 25 mm and basis weight of 298 g/m$^2$ | 144.4 | 5.035 | 99.992 | 378.3 |
| Panel element with a classical prefilter with thickness of 25 mm and basis weight of 177 g/m$^2$ | 141.9 | 5.035 | 99.991 | 345.62 |
| Panel element with a classical prefilter with thickness of 25 mm and basis weight of 388 g/m$^2$ | 151.8 | 5.040 | 99.998 | 314.27 |
| Panel element with the current prefilter with thickness of 25 mm and basis weight of 416 g/m$^2$ | 144.4 | 5.033 | 99.993 | 505.9 |

Figure 14:
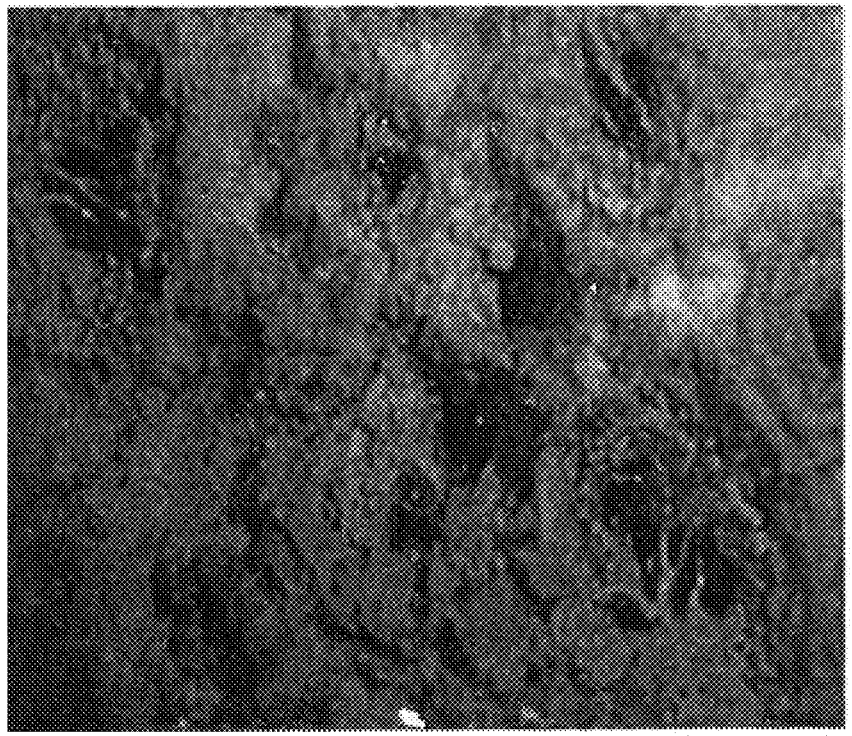
FIG. 14 is a photograph at 35 times enlargement showing contaminant cake build-up on prior filter medias such as shown in FIG. 1.
Figure 15:
FIG. 15 is a photograph at 35 times enlargement showing contaminant cake build-up on filter media in accordance with the present invention.

FIG. 14 is a photomicrograph at 35 times enlargement showing the surface of the last noted prior art prefilter after testing. Of note are the craters visible at the needle holes, such as 22, FIGS. 1 and 4, and the discontinuity and uneven contaminant cake loading across such surface. FIG. 15 is a photomicrograph at 35 times enlargement of the present prefilter element 80 noted in the fourth row of the table after the noted testing. Of note in FIG. 15 is the uniform evenly distributed contaminant cake loading.

It is recognized that various equivalents, alternatives and modifications are possible within the scope of the appended claims.

What is claimed is:

1. Filter media construction comprising a sheet of filter material having a thickness dimension between oppositely facing first and second sides for filtering particles in fluid flow therethrough along a flow direction perpendicular to said sheet and said first and second sides and parallel to said thickness dimension, said sheet being formed by an internal pleated subsheet comprising a plurality of fibers and having a plurality of pleats extending between first and second sets of pleat tips, said pleats extending parallel to said flow direction, said first set, of pleat tips providing said first side of said sheet, said second set of pleat tips providing said second side of said sheet, said pleats engaging each other sufficiently tightly such that fluid flows along said flow direction through said pleats in parallel therewith, rather than between said pleats and then transversely therethrough, said subsheet having a prepleated planar condition with said fibers extending dominantly parallel thereto and dominantly unidirectionally parallel to each other, said subsheet having a pleated condition forming said sheet wherein said fibers extend along said pleats substantially parallel to said flow direction, and said fibers extend around said pleat tips substantially parallel to each respective side of said sheet and substantially perpendicular to said flow direction, and wherein said pleats are bonded to each other with bonding material to prevent flow of fluid therebetween along said flow direction parallel to said pleats, said bonding of said pleats to each other enhancing compression resistance of said sheet along said thickness dimension and eliminating needle holes associated with needling.

2. The invention according to claim 1 wherein said subsheet is non-woven.

3. The invention according to claim 1 wherein said plurality of fibers comprise at least first and second sets of different fibers.

4. The invention according to claim 3 wherein the fibers of said first set have a different diameter than the fibers of said second set.

5. The invention according to claim 3 wherein the fibers of said first and second sets comprise a triboelectric fiber combination comprising triboelectric fibers providing a triboelectric effect, said triboelectric fibers defining a plurality of electric field flux lines therebetween, said flux lines being dominantly perpendicular to said flow direction, said flux lines being stacked along said flow direction in a plane parallel thereto such that said fluid flows along said plane and perpendicular to said flux lines and cuts serially sequentially across plural flux lines, increasing the chances of triboelectric capture due to the increased number of flux lines crossed.

6. The invention according to claim 1 wherein said sheet is a flat planar panel.

7. The invention according to claim 1 wherein said sheet is annular, and said flow direction is radial relative thereto.

8. An extended life fluid filter assembly for filtering particles in fluid flow therethrough along a flow direction, comprising first and second filter elements, each filter element comprising pleated filter media having a plurality of pleats extending between first and second sets of pleat tips, the pleats of each filter element being substantially parallel to said flow direction and extending along said flow direction between respective pleat tips, the pleats of one of said filter elements being spaced from each other along a spacing direction transverse to said flow direction and defining a transverse gap therebetween through which fluid flows, the pleats of the other of said filter elements being packed against each other without said transverse gap, and blocking fluid flow therebetween.

9. The invention according to claim 8 wherein:
    said fluid flows transversely through the pleats of said one filter element; and
    said fluid flows along said flow direction through the pleats of said other filter element in parallel therewith, rather than transversely therethrough.

10. The invention according to claim 9 wherein:
    said fluid flow through said pleats of said one filter element is substantially transverse to said flow direction; and
    said fluid flow through said pleats of said other filter element is substantially parallel to said flow direction.

11. The invention according to claim 10 wherein said pleats of said other filter element are bonded to each other.

12. The invention according to claim 10 wherein said one filter element is downstream of said other filter element.

13. An extended life fluid filter assembly for filtering particles in fluid flow therethrough along a flow direction, comprising in combination:

a main filter element comprising pleated filter media having a plurality of pleats extending between first and second sets of pleat tips, said pleats extending generally parallel to said flow direction and spaced from each other along a spacing direction transverse to said flow direction and defining a transverse gap therebetween through which fluid flows, such that fluid flows along said flow direction between pleat tips of said first set and then transversely through said pleats and then along said flow direction between said pleat tips of said second set;

a prefilter element adjacent and upstream of said main filter element, said prefilter element comprising a sheet of filter material having a thickness dimension between oppositely facing first and second sides for filtering particles in fluid flow therethrough along said flow direction perpendicular to said sheet and said first and second sides and parallel to said thickness dimension, said second side being adjacent said main filter element, said sheet being formed by an internal pleated subsheet comprising a plurality of fibers and having a plurality of pleats extending between first and second sets of pleat tips, said pleats of said subsheet extending parallel to said flow direction, said first set of pleat tips of said subsheet providing said first side of said sheet, said second set of pleat tips of said subsheet providing said second side of said sheet, said pleats of said subsheet engaging each other and packed sufficiently tightly against each other such that fluid flows along said flow direction through said pleats of said subsheet in parallel with said pleats, rather than between said pleats of said subsheet and then transversely therethrough, said subsheet having a pre-pleated planar condition with said fibers extending dominantly parallel thereto and dominantly unidirectionally parallel to each other, said subsheet having a pleated condition forming said sheet wherein said fibers extend along said pleats of said subsheet substantially parallel to said flow direction, and said fibers extend around said pleat tips of said subsheet substantially parallel to each respective side of said sheet and substantially perpendicular to said flow direction.

14. The invention according to claim 13 wherein said main filter element and said prefilter element are flat planar panels.

15. The invention according to claim 13 wherein said main filter element and said prefilter element are annular and said flow direction is radial relative thereto, said prefilter element being concentric to said main filter element.

16. The invention according to claim 13 wherein said subsheet of said prefilter element is non-woven.

17. The invention according to claim 16 wherein said subsheet of said prefilter element is non-needled, eliminating needle holes otherwise caused by needling.

18. The invention according to claim 13 wherein said plurality of fibers of said subsheet of said prefilter element comprise at least first and second sets of different fibers.

19. The invention according to claim 18 wherein the fibers of said first set having a different diameter than the fibers of said second set.

20. The invention according to claim 18 wherein the fibers of said first and second sets comprise a triboelectric fiber combination comprising triboelectric fibers providing a triboelectric effect, said triboelectric fibers defining a plurality of electric field flux lines therebetween, said flux lines being dominantly perpendicular to said flow direction, said flux lines being stacked along said flow direction in a plane parallel thereto such that said fluid flows along said plane and perpendicular to said flux lines and cuts serially sequentially across plural flux lines, increasing the chances of triboelectric capture due to the increased number of flux lines crossed.

21. The invention according to claim 13 wherein said pleats of said subsheet are bonded to each other to prevent flow of fluid therebetween along said flow direction parallel to said pleats of said subsheet, said bonding of said pleats of said subsheet to each other enhancing compression resistance of said sheet along said thickness dimension and eliminating needle holes associated with needling.

22. The invention according to claim 13 wherein the solidity of said subsheet of said prefilter element is in the range of 1% to 10%.

23. The invention according to claim 13 wherein the fiber size of said fibers of said subsheet of said prefilter element is in the range of 0.1 to 50 denier.

24. The invention according to claim 13 wherein said thickness dimension is in the range of 2 to 75 millimeters.

25. The invention according to claim 13 wherein the ratio of the velocity of fluid flow through said prefilter element to the velocity of fluid flow through said main filter element is in the range of 2 to 25.

* * * * *